(12) United States Patent
Al Shalabi

(10) Patent No.: US 9,242,600 B2
(45) Date of Patent: Jan. 26, 2016

(54) SAFETY APPARATUS

(71) Applicant: Ahmad Omar Al Shalabi, Valparaiso, IN (US)

(72) Inventor: Ahmad Omar Al Shalabi, Valparaiso, IN (US)

(*) Notice: Subject to any disclaimer, the term of this patent is extended or adjusted under 35 U.S.C. 154(b) by 255 days.

(21) Appl. No.: 14/092,403

(22) Filed: Nov. 27, 2013

(65) Prior Publication Data

US 2015/0145667 A1   May 28, 2015

(51) Int. Cl.
*B60Q 1/46* (2006.01)
*B60Q 7/00* (2006.01)
*E01F 9/012* (2006.01)

(52) U.S. Cl.
CPC .. *B60Q 7/00* (2013.01); *E01F 9/012* (2013.01)

(58) Field of Classification Search
CPC .............. B60Q 1/46; B60Q 7/00; B60Q 1/52; B60Q 1/2611; B60Q 1/50; E01F 9/012; G08B 5/38
USPC ....................................................... 340/473
See application file for complete search history.

(56) References Cited

U.S. PATENT DOCUMENTS

| 5,606,309 | A  | 2/1997 | Smith          |
|-----------|----|--------|----------------|
| 5,924,228 | A  | 7/1999 | Yang           |
| 6,275,149 | B1 | 8/2001 | Tung           |
| 6,535,117 | B2 | 3/2003 | Haerer         |
| 6,543,165 | B2 | 4/2003 | Youseph et al. |
| 7,158,020 | B2 | 1/2007 | Grady, Jr.     |
| 2006/0103543 | A1* | 5/2006 | Chen ............... B60Q 7/00 340/815.45 |
| 2006/0181432 | A1 | 8/2006 | Monteith et al. |
| 2007/0011928 | A1 | 1/2007 | Wang |
| 2007/0091605 | A1 | 4/2007 | Horibata |
| 2007/0189028 | A1* | 8/2007 | Chen ............... B60Q 7/00 362/545 |
| 2009/0022547 | A1 | 1/2009 | Lo |
| 2012/0188071 | A1 | 7/2012 | Ho |

FOREIGN PATENT DOCUMENTS

DE     102004039390 A1 *  2/2006  ............... B60Q 7/00

OTHER PUBLICATIONS

International Search Report and Written Opinion, Application No. PCT/US14/61757, dated Jan. 21, 2015.

* cited by examiner

*Primary Examiner* — Omer S Khan
(74) *Attorney, Agent, or Firm* — Michael A. Carrillo; Barnes & Thornburg LLP

(57) ABSTRACT

A safety apparatus for use as a roadside warning device comprises a base, a light source disposed within the base and adapted to project light away from the base, and an alert system rotatably attached to the base. The alert system includes a plurality of arms shaped to form a visual alert member, wherein at least first and second arms are collapsible upon a third arm. A plurality of lights are disposed on one or more of the first, second, and third arms. In a first orientation, the alert system is disposed at a non-zero angle with respect to the base and the first, second, and third arms of the alert system are formed into the visual alert member and, in a second orientation, the alert system is collapsed and parallel to the base.

14 Claims, 4 Drawing Sheets

SAFETY APPARATUS

BACKGROUND

1. Field of the Disclosure

The present disclosure relates generally to a safety apparatus and, more particularly, to a safety apparatus for use in alerting others of a roadside condition.

2. Description of the Background

It is very common for a driver of a motor vehicle, such as a car, truck, or semi-tractor trailer, to experience a flat tire or other vehicular failure that may cause the driver to pull their vehicle to a side of a road. In such situations, the driver or a passenger may need to exit the vehicle and inspect the vehicle or repair the vehicle, for example, to change a tire. Regardless of the road conditions, the amount of traffic, and/or the time of day, exiting the vehicle can be very dangerous. Warning devices have been developed to assist drivers and passengers in such dangerous situations.

One such warning device is a flare. A number of flares may be stored in a bag, box, or other container in, for example, a trunk of the vehicle. When necessary, one or more of the flares may be activated and positioned on a roadway to alert other drivers of the emergency condition. While flares are useful, they can be difficult to use and positioning of the flares in a manner sufficient to alert other drivers can be dangerous.

SUMMARY

In illustrative embodiments, a safety apparatus for use as a roadside warning device may include a base, a light source disposed within the base and adapted to project light away from the base, and an alert system rotatably attached to the base. The alert system may include a plurality of arms shaped to form a visual alert member, wherein at least first and second arms are collapsible upon a third arm. A plurality of lights may be disposed on one or more of the first, second, and third arms. In a first orientation, the alert system may be disposed at a non-zero angle with respect to the base and the first, second, and third arms of the alert system may be formed into the visual alert member and, in a second orientation, the alert system may be collapsed and parallel to the base.

In alternative illustrative embodiments, a battery-operated safety apparatus for use as a roadside warning device may include a base for holding at least one battery and having a planar surface adapted to support the safety apparatus upon a surface and a light source disposed within the base and adapted to project light away from the base. The safety apparatus may further include an alert system rotatably mounted to the base and including first, second, and third arms shaped to form a triangular visual alert member, wherein the first and second arms are collapsible upon the third arm and a plurality of lights disposed on one or more of the first, second, and third arms. In a first orientation, the alert system may be disposed at a non-zero angle with respect to the base and the first, second, and third arms of the alert system may be formed into a triangle and, in a second orientation, the alert system may be collapsed and parallel to the base.

In still other illustrative embodiments, a method of using a safety apparatus as a roadside warning device, wherein the safety apparatus may include a base and an alert system rotatably attached to the base and having a plurality of arms adapted to form a visual alert member and a plurality of lights disposed on one or more of the arms, is disclosed. The method may include the step of unfolding at least two arms of the alert system to form a visual alert member. The method may further include the steps of rotating the alert system about the base such that the alert system is disposed at a non-zero angle with respect to the base and positioning the safety apparatus on a surface.

BRIEF DESCRIPTION OF THE DRAWINGS

Other aspects and advantages of the present disclosure will become apparent upon consideration of the following detailed description, wherein similar structures have like or similar reference numerals.

DETAILED DESCRIPTION

The present disclosure is directed to safety apparatuses and methods for alerting drivers to roadside conditions. While the apparatuses and methods of the present disclosure may be embodied in many different forms, several specific embodiments are discussed herein with the understanding that the present disclosure is to be considered only as an exemplification of the principles of the disclosure, and it is not intended to limit the disclosure to the embodiments illustrated.

Figure 1:
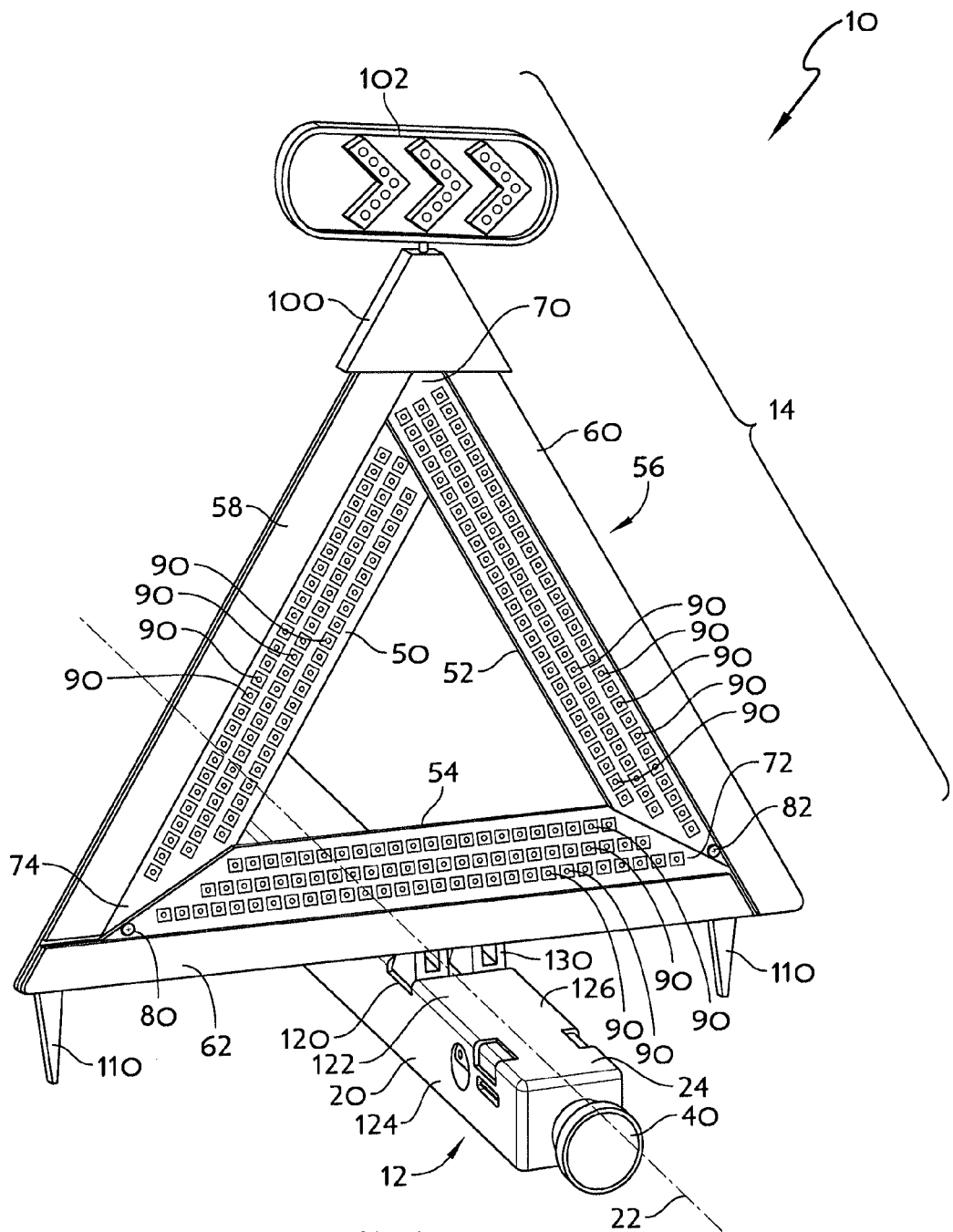
FIG. 1 is a top isometric view of a first embodiment of a safety apparatus including a base and an alert system rotatably attached to the base.
Figure 2:
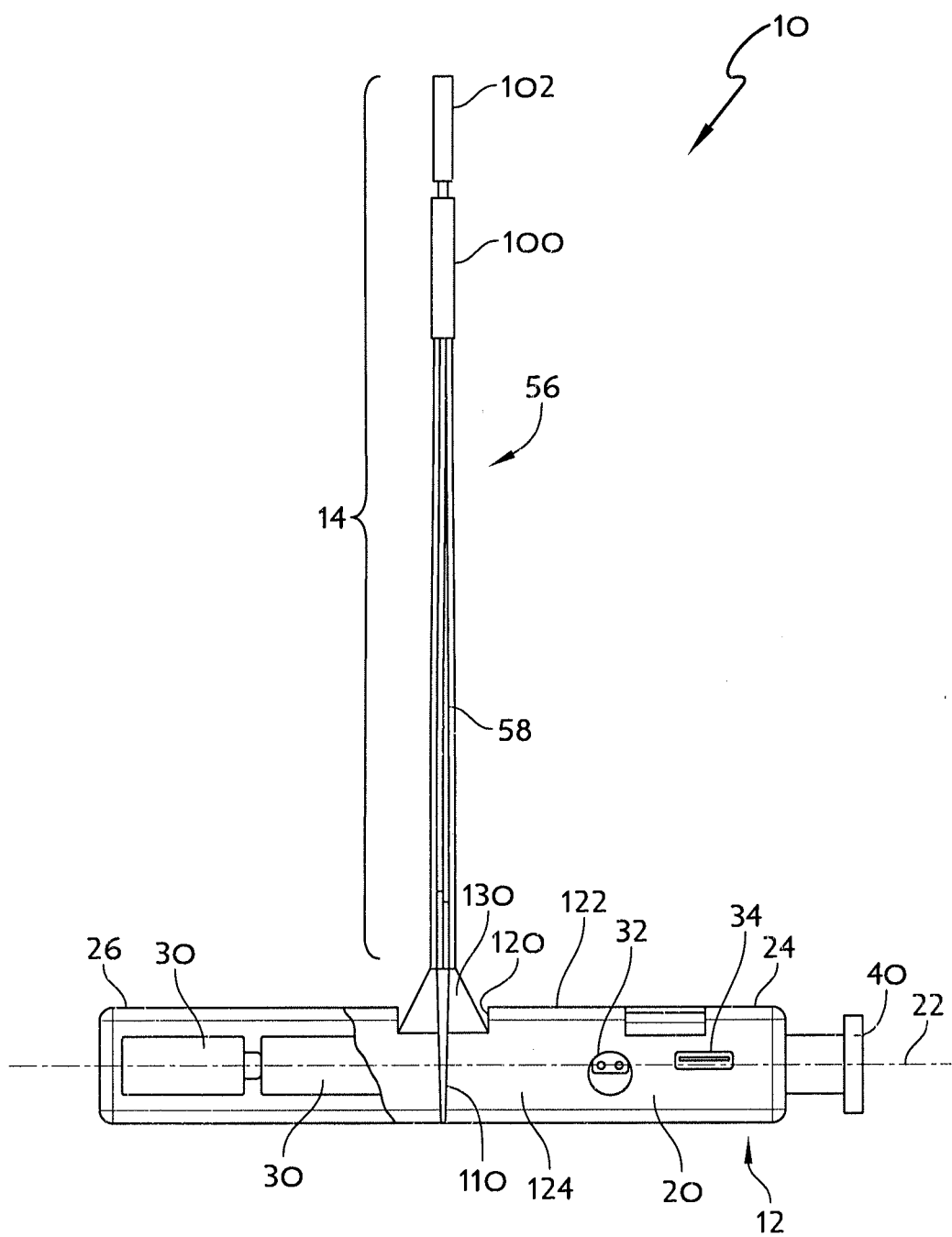
FIG. 2 is a side elevational view of the safety apparatus of FIG. 1, wherein a portion of the base has been removed to show batteries disposed within the base.

A first embodiment of a portable, battery-operated safety apparatus 10 is depicted in FIGS. 1 and 2. The safety apparatus 10 generally includes a base 12 and an alert system 14 rotatably attached to the base 12. The alert system 14 may alternatively or additionally be detachable from the base 12. The base 12 includes a housing 20 extending along a longitudinal axis 22 and having first and second ends 24, 26. While the base 12 is shown as having a generally square cross-sectional shape, the base 12 may alternatively have any other suitable shape. In illustrative embodiments, the cross-sectional shape of the base 12 may provide a stable support for the base 12 upon a surface, for example, by way of a rectangular, pentagonal, octagonal, or other shape having at least one planar side. In other illustrative embodiments, the base 12 may have a non-planar cross-sectional shape, for example, a circular or oval-shape. In such embodiments, the base 12 may include one or more supports (not shown) to stabilize the base 12 on a surface. The housing 20 of the base 12 may be constructed of metal, plastic, or any other suitable material or combination of materials.

The base 12 may house electrical circuitry (not shown) for operating the safety apparatus 10. In illustrative embodiments, the safety apparatus 10 may include a microprocessor, application specific integrated circuit, or any other suitable electrical circuitry for operating the safety apparatus 10. One or more batteries 30, as seen in FIG. 2, may be disposed within the housing 20 to provide power to the components of the safety apparatus 10, as will be discussed in greater detail below. The batteries 30 may be any suitable type or size of battery, for example, AAA batteries, AA batteries, C batteries, D batteries, or any other suitable batteries. The batteries 30 may be disposable or rechargeable batteries.

The base 12 may include one or more electrical connectors for providing power to the safety apparatus 10 and/or to recharge the batteries 30 within the safety apparatus 10. In an illustrative embodiment, the base 12 includes a first electrical connector 32 in the form of a connector that accepts a power cord (not shown), for example, a power cord that may be plugged into a typical electrical outlet. In a further illustrative embodiment, the base 12 may additionally or alternatively include a second electrical connector 32 in the form of a universal serial bus (USB) connector. A USB cord (not shown) may be connected between the second electrical connector 32 and a computer, a peripheral device, or any other device having a USB or other connector. In other illustrative embodiments, the base 12 may include any suitable electrical connector and/or may include any number of the same or different electrical connectors. While the electrical connectors (in combination with appropriate cords or connections) are described as being capable of transferring power to the safety apparatus 10, the connectors and cords may be used for any other suitable purpose(s), for example, to program the safety apparatus 10 and/or transfer data to the safety apparatus 10.

Referring to FIGS. 1 and 2, a light 40 is disposed at the first end 24 of the base 12. The light 40 may include one or more light bulbs, light emitting diodes (LEDs), any other suitable light source(s) that is provided power from the batteries 30. In use, as described in greater detail hereinafter, the base 12 may be used alone as a flashlight or may be used as a warning signal in combination with the alert system 14. While the light 40 is shown at the first end 24 of the housing 12, the light may be disposed at any suitable position on the housing 12. In an illustrative embodiment, the housing 12 may include lights 40 at both the first and second ends 24, 26 of the housing 12.

The alert system 14, as best seen in FIGS. 1 and 2, includes first, second, and third arms 50, 52, 54 connected to form a triangular visual alert member 56. In an illustrative embodiment, first, second, and third sleeves 58, 60, 62 cover outer edges of each of the arms 50, 52, 54, respectively. Each sleeve 58, 60, 62 may cover a portion of an adjacent arm 50, 52, 54 to retain the visual alert member 56 in the shape of a triangle. For example, the sleeve 58 may cover an end 70 of the second arm 52, the sleeve 60 may cover an end 72 of the third arm 54, and the sleeve 62 may cover an end 74 of the first arm 50. In an alternative illustrative embodiment, the triangular visual alert member 56 may be retained in the shape of a triangle in any other suitable manner. In an illustrative embodiment, the third arm 54 may be connected to the first and second arms 50, 52 at pivot points 80, 82 by a pin, hinge, or other mechanism.

While the sleeves 58, 60, 62 are shown as covering outer edges of the arms 58, 60, 62, respectively, sleeves may alternatively or additionally cover inner edges of the arms 58, 60, 62. Optionally, a single support structure may extend about all or portions of the outer or inner edges of the arms 58, 60, 62 to provide support to the alert system 14.

Referring to FIG. 1, each of the arms 50, 52, 54 may include a plurality of light sources 90, for example, LEDs or any other suitable light source(s). In an illustrative embodiment, the light sources 90 may be arranged in any number of rows, for example, three or four rows, extending along a length of each arm 50, 52, 54. The light sources 90 may emit white light or light of any other suitable color or colors. In an illustrative embodiment, the lights sources 90 may be multi-colored LEDs, wherein the color of the LEDs may be changed depending on the time of day, the road conditions, the type of incident, or any other factors. In another illustrative embodiment, the light sources 90 may be blinking LEDs that rapidly turn on and off. In another illustrative embodiment, the light sources 90 may be pulse width modulated to conserve power and/or to cause a blinking or flickering of light. In a further illustrative embodiment, LEDs may be arranged in a particular shape or pattern and/or may be arranged to form a letter or word. The light sources 90 may include one or more of the described features.

While the alert system 14 is shown as having three arms 50, 52, 54 forming a triangle, the alert system 14 may have any number of arms forming any suitable shape and may be retained in such shape in any suitable manner. The arms 50, 52, 54 may be constructed of metal, plastic, or any other suitable material or combination of materials. The sleeves 58, 60, 62 may be constructed of a flexible material, for example, rubber, plastic, or any other suitable material or combination of materials.

An optional cap 100 may be disposed over the sleeves 58, 60 at the end 70 of the second arm 52, as seen in FIG. 1. The cap 100 may function to retain the triangular visual alert member 56 in its shape. The cap 100 may additionally or alternatively include a further visual alert 102, for example, in the form of an arrow formed of one or more reflective elements. Optionally or additionally, the visual alert 102 may include any suitable visual alert. The cap 100 and the visual alert 102 may be made of any suitable material or combination of materials, for example, plastic and/or metal.

Referring again to FIGS. 1 and 2, one or more legs 110 may extend downwardly from, for example, the third arm 54. When the base 12 is positioned on a surface, the legs 110 sit on the surface to stabilize the safety apparatus 10. Any number of legs 110 may be utilized and the legs 110 may take any form or shape. In an illustrative embodiment, the legs 110 may be made of a rigid material, for example, a rigid plastic material or metal to provide adequate support and stability for the safety apparatus 10. The legs may be stationary but may alternatively be pivotable about the third arm 54 and/or the third sleeve 62 or may selectively collapsible or retractable.

As best seen in FIG. 2, the alert system 14 sits atop the base 12. In an illustrative embodiment, a groove 120 may be disposed in a top surface 122 of the housing 12 extending between first and second sides 124, 126 of the housing 12. The alert system 14 may include a bracket 130 extending from, for example, the third sleeve 62 and/or the third arm 54. In a first orientation, the bracket 130 is snapped into the groove 120 to position the alert system 14 with the third arm 54 at an angle (non-parallel to or at a non-zero angle) with respect to the base 12. In an illustrative embodiment, the third arm 54 is disposed in a vertical plane that is at an angle of about 90 degrees with respect a horizontal plane that extends through the base 12. In other illustrative embodiments, the third arm 54 may be disposed at any suitable angle with respect to the base 12, for example, any angle greater than zero and up to about 90 degrees. Wires may extend through the bracket 130 to connect the light sources 90 to the base 12 to supply power to the light sources 90.

As noted above, the bracket 130 is rotatably attached to the base 12. In an illustrative embodiment, the alert system 14 may be positioned in a second orientation. In particular, the bracket 130 may be pulled out of the groove 120, for example, against the bias of a spring (not shown), twisted 90 degrees (or any other suitable angle depending on the original orientation of the alert system 14 with respect to the base 12), and snapped back into the groove 120 such that the alert system 14 is parallel to the base 12. Alternatively, the bracket 130 may be rotatably attached to the base 12 in any other suitable manner that allows rotation of the alert system 14 about the base 12, while still allowing wires and other electrical connections to extend from the base into the alert system 14 to power the light sources 90.

Figure 3:
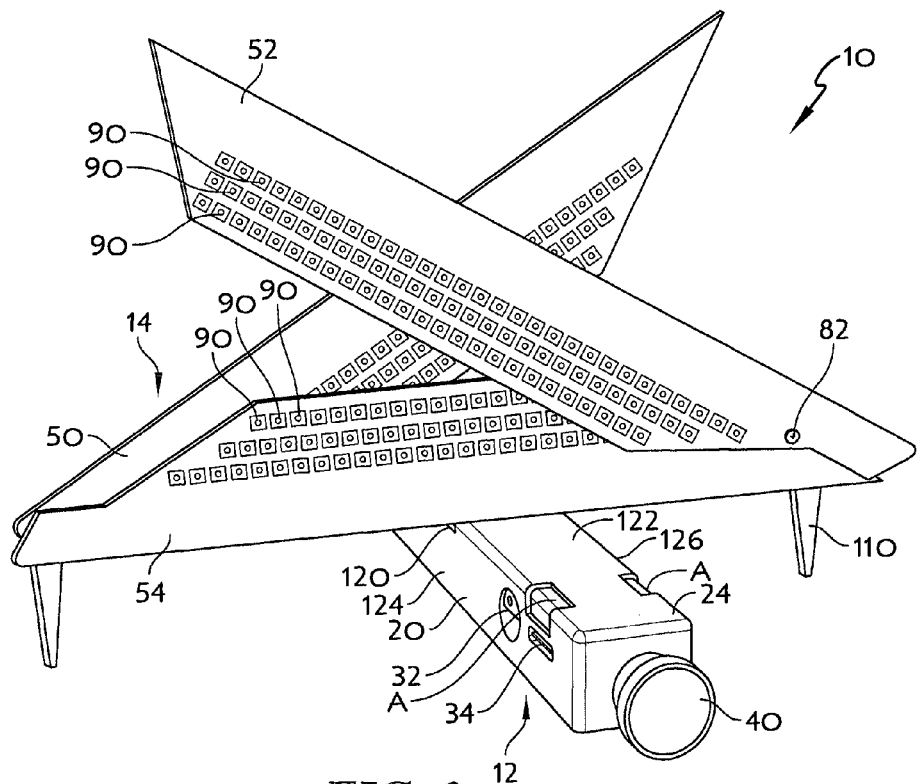
FIG. 3 is a top isometric view of the safety apparatus of FIG. 1 as two arms of the alert system are collapsed upon a third arm of the alert system.
Figure 4:
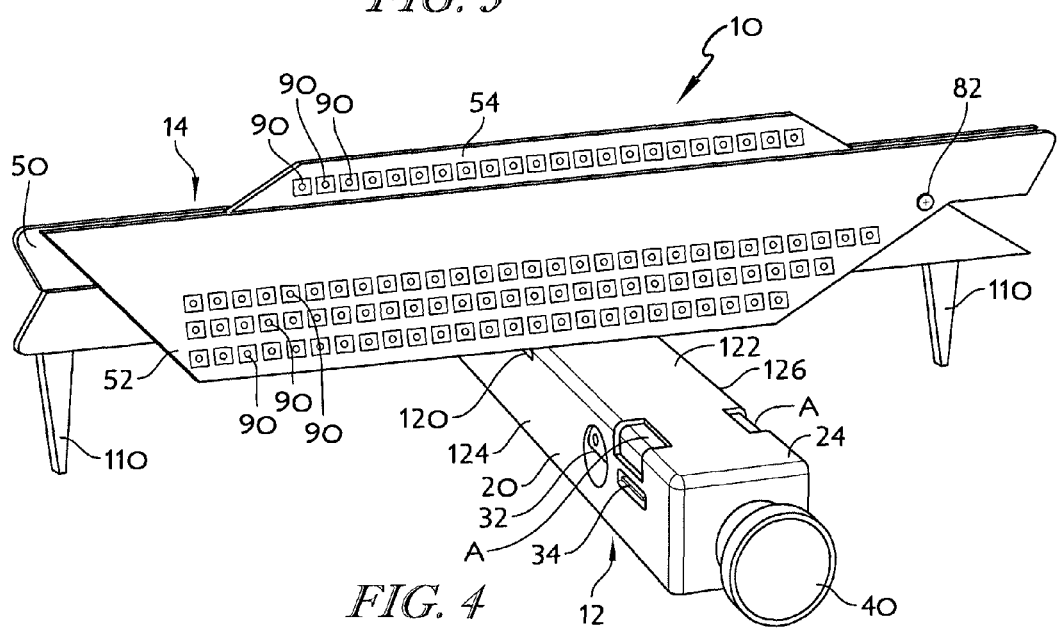
FIG. 4 is a top isometric view of the safety apparatus of FIG. 1 after the two arms are collapsed upon the third arm.
Figure 5:
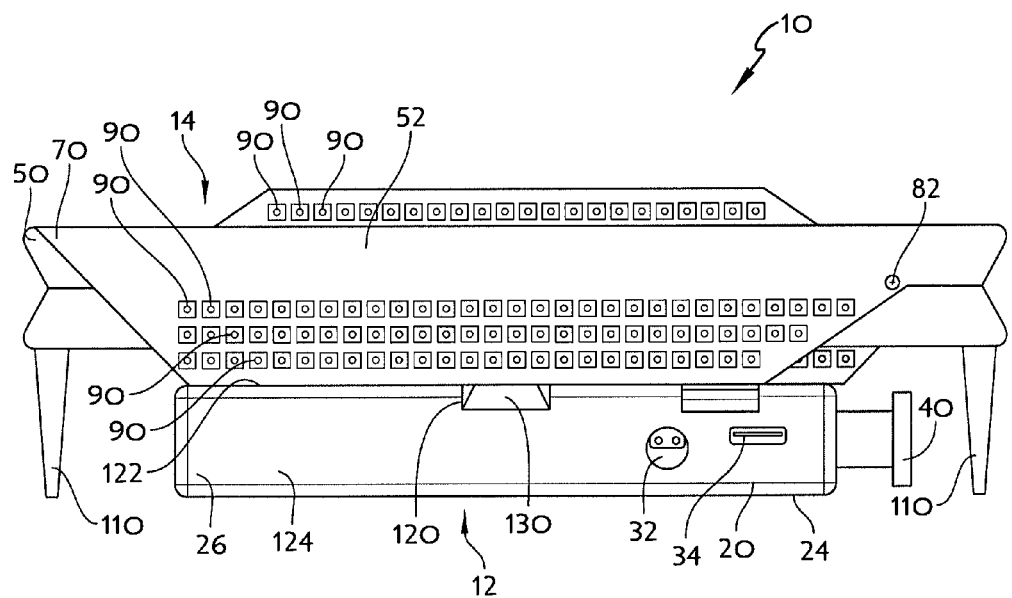
FIG. 5 is a side elevational view of the safety apparatus of FIG. 4, after the collapsed arms have been rotated to a position that is parallel to the base.
Figure 6:
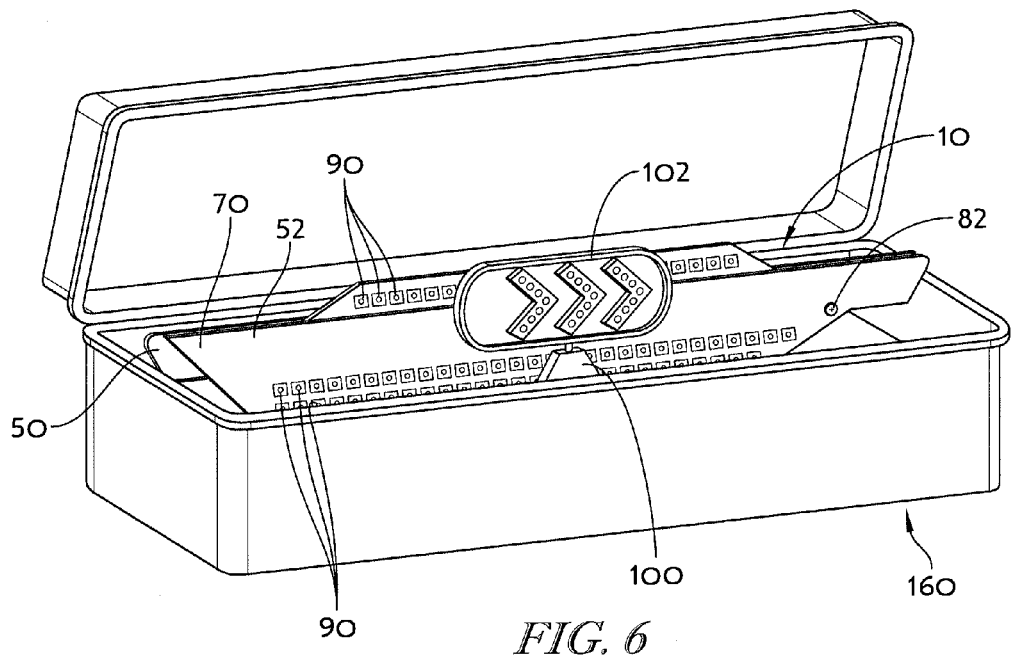
FIG. 6 is a top isometric view of the safety apparatus after it has been collapsed, as shown in FIG. 5, and stored in a storage case.

As best seen in FIGS. 3 and 4, the alert system 14 may be folded and rotated to allow the safety apparatus 10 to be stored in a storage case 160. More specifically, the process for storing the safety apparatus 10 includes the step of removing the cap 100 and/or the sleeves 58, 60, 62 from the alert system 14 and folding the first and second arms 50, 52 of the alert system 14 about the pivot points 80, 82, respectively. The first and second arms 50, 52 are folded inwardly such that the first, second, and third arms 50, 52, 54 are disposed adjacent the base 12. In an alternative illustrative embodiment, the first and second arms 50, 52 may be detachably connected to the third arm 54 and may be detached and placed adjacent the third arm 54 for storage. The alert system 14 with folded arms 50, 52 is thereafter rotated, as described in detail above, about the bracket 130, such that the arms 50, 52, 54 are parallel to the base 12. While the alert system 14 is described as being folded prior to rotation of the alert system 14, the alert system 14 may be folded after rotation of the alert system 14.

Once the alert system 14 has been folded and rotated, the safety apparatus 10 is small enough to fit within the storage case 160 for storage in a trunk or other area of a vehicle. As noted above, the base 12 may be used as a flashlight, for example, when the alert system 14 is folded and rotated. In illustrative embodiments, a band, clip, or other device may be provided to retain the alert system 14 in a folded position. In this manner, the folded and rotated safety apparatus 10 may be held by a user such that the safety apparatus 10 may function as a flashlight. As noted above, the alert system 14 may be detached from the base 12, in which case, the alert system 14 may be supported upon the legs 110 and the base 12 may be independently used as a flashlight.

While not shown in the figures, the base 12 in any of the embodiments herein may include one or more switches. One or more switches may be provided for any number of functions, for example, turning the light 40 on and off, changing a color or other feature of the light 40, turning the light sources 90 on and off, changing a color or other feature of the light sources 90, changing or setting light illumination programs for the light 40 and/or light sources 90, and/or providing programming to the safety apparatus 10 and/or any of its electrical components. The switch(es) may be electrically connected to the light 40, the light source 90, and/or any other electrical components of the safety apparatus 10.

Although directional terminology, such as front, back, top, bottom, upper, lower, etc. may be used throughout the present specification, it should be understood that such terms are not limiting and are only utilized herein to convey the orientation of different elements with respect to one another.

Numerous modifications to the present disclosure will be apparent to those skilled in the an in view of the foregoing description. Accordingly, this description is to be construed as illustrative only and is presented for the purpose of enabling those skilled in the art to make and use the embodiments of the disclosure and to teach the best mode of carrying out same. The exclusive rights to all modifications which come within the scope of the appended claims are reserved.

The invention claimed is:

1. A safety apparatus for use as a roadside warning device, the safety apparatus comprising:
   a base;
   a connector disposed within the base for attachment of an electrical connector;
   a light source disposed within the base and adapted to project light away from the base;
   legs extending from the alert system and adapted to support the alert system upon a support surface;
   a cap mounted upon the alert system at a junction between the first and second arms, wherein the cap includes a visual alert including one or more reflective elements;
   an alert system rotatably attached to the base and including:
      a plurality of arms shaped to form a visual alert member, wherein at least first and second arms are collapsible upon a third arm; and
      a plurality of lights disposed on one or more of the first, second, and third arms;
      a bracket extending from the alert system, wherein the bracket is rotatably mounted to the base such that the bracket is capable of rotating at least 90 degrees about the base;
   wherein, in a first orientation, the alert system is disposed at a non-zero angle with respect to the base and the first, second, and third arms of the alert system are formed into the visual alert member and, in a second orientation, the alert system is collapsed and parallel to the base.

2. The safety apparatus of claim 1, further including batteries disposed within the base such that the batteries are electrically connected to the light source and the lights in the one or more of the first, second, and third arms.

3. The safety apparatus of claim 1, wherein the first and second arms are connected to the third arm at pivot points such that the first and second arms rotate about the pivot points into a collapsed position adjacent the third arm.

4. The safety apparatus of claim 1, wherein the first and second arms are detachably attached to the third arm such that the first and second arms may be detached and stored adjacent the third arm.

5. The safety apparatus of claim 1, wherein the lights are in the form of one or more rows of light emitting diodes (LEDs) disposed along a length of each of the first, second, and third arms.

6. A battery-operated safety apparatus for use as a roadside warning device, the safety apparatus comprising:
   a base for holding at least one battery and having a planar surface adapted to support the safety apparatus upon a surface, and at least one connector disposed within the base for attachment of an electrical connector;
   a light source disposed within the base and adapted to project light away from the base;
   at least one connector disposed within the base for attachment of an electrical connector;
   legs extending from the alert system and adapted to support the alert system upon a support surface;
   a cap mounted upon the alert system at a junction between the first and second arms, wherein the cap includes a visual alert including one or more reflective elements; and
   an alert system rotatably mounted to the base and including:
      first, second, and third arms shaped to form a triangular visual alert member, wherein the first and second arms are collapsible upon the third arm; and
      a plurality of lights disposed on one or more of the first, second, and third arms;
      a bracket extending therefrom that extends into a groove in a surface of the base to retain the alert system in position and allowing the alert system to be rotated by repositioning the bracket within the groove;

wherein, in a first orientation, the alert system is disposed at a non-zero angle with respect to the base and the first, second, and third arms of the alert system are formed into a triangle and, in a second orientation, the first, second, and third arms of the alert system are collapsed and parallel to the base.

7. The safety apparatus of claim 6, wherein the first and second arms are attached at pivot points to the third arm, such that the first and second arms are rotatable about the pivot points to a position in which they are parallel to the third arm.

8. The safety apparatus of claim 6, wherein the alert system is detachable from the base.

9. A method of using a safety apparatus as a roadside warning device, the safety apparatus including:
- a base;
- a light source disposed within the base and adapted to project light away from the base;
- at least one connector disposed within the base for attachment of an electrical connector;
- legs extending from the alert system and adapted to support the alert system upon a support surface;
- a cap mounted upon the alert system at a junction between the first and second arms, wherein the cap includes a visual alert including one or more reflective elements; and
- an alert system rotatably attached to the base and having a plurality of arms adapted to form a visual alert member, wherein at least first and second arms are collapsible upon a third arm;
- a plurality of lights disposed on one or more of the first, second, and third arms;
- a bracket extending therefrom that extends into a groove in a surface of the base to retain the alert system in position and allowing the alert system to be rotated by repositioning the bracket within the groove;

the method comprising the steps of:
- unfolding at least two arms of the alert system to form the visual alert member;
- rotating the alert system about the base such that the alert system is disposed at a non-zero angle with respect to the base; and
- positioning the safety apparatus on a surface.

10. The method of claim 9, wherein the non-zero angle is greater than 0 and up to about 90 degrees.

11. The method of claim 9, wherein the unfolding step includes the steps of: pivoting the first and second arms away from the third arm; positioning at least the first, second, and third arms to form the visual alert member; and retaining at least the first, second, and third arms in relation to one another.

12. The method of claim 9, wherein the unfolding step includes the steps of: attaching the first and second arms to the third arm of the alert system; positioning at least the first, second, and third arms to form the visual alert member; and retaining at least the first, second, and third arms in relation to one another.

13. The method of claim 9, wherein the safety apparatus may be stored in a non-use position by performing the steps of: positioning the first and second arms adjacent the third arm; and rotating the alert system such that the alert system is parallel with the base.

14. The method of claim 13, further including the step of storing the safety apparatus in a storage case.

* * * * *